United States Patent
Hiratsuka (10) Patent No.: US 9,853,286 B2
(45) Date of Patent: Dec. 26, 2017

(54) POSITIVE ELECTRODE ACTIVE MATERIAL FOR NON-AQUEOUS ELECTROLYTE SECONDARY BATTERY AND NON-AQUEOUS ELECTROLYTE SECONDARY BATTERY

(71) Applicant: Panasonic Corporation, Osaka (JP)

(72) Inventor: Hidekazu Hiratsuka, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 60 days.

(21) Appl. No.: 14/480,947

(22) Filed: Sep. 9, 2014

(65) Prior Publication Data

US 2015/0093643 A1 Apr. 2, 2015

(30) Foreign Application Priority Data

Sep. 30, 2013 (JP) ................. 2013-203320

(51) Int. Cl.
*H01M 4/525* (2010.01)
*H01M 4/505* (2010.01)
*C01G 53/00* (2006.01)
*H01M 4/02* (2006.01)

(52) U.S. Cl.
CPC ............ *H01M 4/525* (2013.01); *C01G 53/50* (2013.01); *H01M 4/505* (2013.01); *C01P 2004/03* (2013.01); *C01P 2004/51* (2013.01); *C01P 2004/61* (2013.01); *C01P 2006/40* (2013.01); *H01M 2004/028* (2013.01); *Y02E 60/122* (2013.01)

(58) Field of Classification Search
CPC ................. H01M 4/525; H01M 4/505; H01M 2004/028; Y02E 60/122; C01P 2004/51; C01P 2004/61
See application file for complete search history.

(56) References Cited

U.S. PATENT DOCUMENTS

| | | | |
|---|---|---|---|
| 6,929,883 B2 * | 8/2005 | Suhara ................. | H01M 4/485 429/231.1 |
| 2009/0035659 A1 * | 2/2009 | Takeuchi ............... | H01B 1/122 429/223 |
| 2013/0143121 A1 * | 6/2013 | Kobayashi ............ | H01M 4/525 429/220 |
| 2015/0221934 A1 * | 8/2015 | Hiratsuka ............. | H01M 4/364 429/223 |

FOREIGN PATENT DOCUMENTS

| | | |
|---|---|---|
| JP | 2005-089225 | 4/2005 |
| JP | 2008-077990 | 4/2008 |
| JP | 4578790 | 11/2010 |
| JP | 5079291 | 11/2012 |

* cited by examiner

*Primary Examiner* — Laura Weiner
(74) *Attorney, Agent, or Firm* — McDermott Will & Emery LLP (57) ABSTRACT

A positive electrode active material for a non-aqueous electrolyte secondary battery according to an embodiment of the present disclosure is represented by a general formula of $Li_xNi_yM_{1-y}O_2$ (where M includes at least one metal element selected from Co and Mn, $0.1 \leq x \leq 1.2$, $0.3 < y < 1$), has a volumetric average particle size (D50) of 7 μm or more and 30 μm or less, and has an average surface roughness of 4% or less.

6 Claims, 3 Drawing Sheets

POSITIVE ELECTRODE ACTIVE MATERIAL FOR NON-AQUEOUS ELECTROLYTE SECONDARY BATTERY AND NON-AQUEOUS ELECTROLYTE SECONDARY BATTERY

BACKGROUND

1. Field

The present disclosure relates to a positive electrode active material for a non-aqueous electrolyte secondary battery and a non-aqueous electrolyte secondary battery.

2. Description of the Related Art

Lithium-nickel compound oxides, which are lithium-transition metal compound oxides mainly containing nickel, are used as positive electrode active materials for non-aqueous electrolyte secondary batteries. However, particles of lithium-nickel compound oxides have a low circularity and a high average surface roughness. Accordingly, positive electrode active material layers formed by such particles have a low filling density of the active materials. Japanese Patent No. 4578790 (Patent Literature 1, hereafter PTL 1) and Japanese Patent No. 5079291 (Patent Literature 2, hereafter PTL 2) describe lithium-nickel compound oxides substantially having a spherical form with a high circularity.

SUMMARY

However, the techniques disclosed by PTLs 1 and 2 provide particles having a small average particle size of less than 1 µm. In the case of using these particles as a positive electrode active material, the particles cannot be controlled so as to have a low average surface roughness.

An embodiment of the present disclosure provides a positive electrode active material for a non-aqueous electrolyte secondary battery that allows an enhanced filling property of the active material in a positive electrode active material layer and that has a high energy density.

A positive electrode active material for a non-aqueous electrolyte secondary battery according to an embodiment of the present disclosure is represented by a general formula of $Li_xNi_yM_{1-y}O_2$ (where M includes at least one metal element selected from cobalt (Co) and manganese (Mn), $0.1 \leq x \leq 1.2$, $0.3 < y < 1$), has a volumetric average particle size (D50) of 7 µm or more and 30 µm or less, and has an average surface roughness of 4% or less.

A positive electrode active material for a non-aqueous electrolyte secondary battery according to an embodiment of the present disclosure is excellent in terms of filling property of the active material in a positive electrode active material layer and energy density.

DESCRIPTION OF EMBODIMENTS

Underlying Knowledge Forming Basis of the Present Disclosure

According to the techniques disclosed in PTLs 1 and 2 described above, primary particles do not form secondary particles and are in a monodisperse state. Alternatively, primary particles having a size of less than 1 µm aggregate to form secondary particles. Thus, these techniques provide particles having an average particle size of less than 1 µm. In the case of using these particles as a positive electrode active material, the particles cannot be controlled so as to have a low average surface roughness.

Regarding such a problem, the inventors of the present disclosure have found the following findings: by increasing the volumetric average particle size (D50) (for example, 7 µm or more and 30 µm or less) or by decreasing the average surface roughness (for example, 4% or less), the filling property of the active material can be enhanced.

On the basis of these findings, embodiments according to the present disclosure provide a positive electrode active material for a non-aqueous electrolyte secondary battery allowing a high filling density of the active material and a high energy density, and a non-aqueous electrolyte secondary battery containing the positive electrode active material.

In this case, the filling property of the positive electrode active material can be enhanced and the energy density can be increased.

A non-aqueous electrolyte secondary battery according to an embodiment of the present disclosure includes a positive electrode containing a positive electrode active material, a negative electrode, and a non-aqueous electrolyte, wherein the positive electrode active material is represented by a general formula of $Li_xNi_yM_{1-y}O_2$ (where M includes at least one metal element selected from cobalt (Co) and manganese (Mn), $0.1 \leq x \leq 1.2$, $0.3 < y < 1$), has a volumetric average particle size (D50) of 7 µm or more and 30 µm or less, and has an average surface roughness of 4% or less.

In this case, the filling property of the positive electrode active material can be enhanced and the energy density can be increased.

Hereinafter, embodiments according to the present disclosure will be described in detail. Note that the present disclosure is not limited to the following embodiments serving as examples for embodying technical ideas of the present disclosure.

Figure 1:
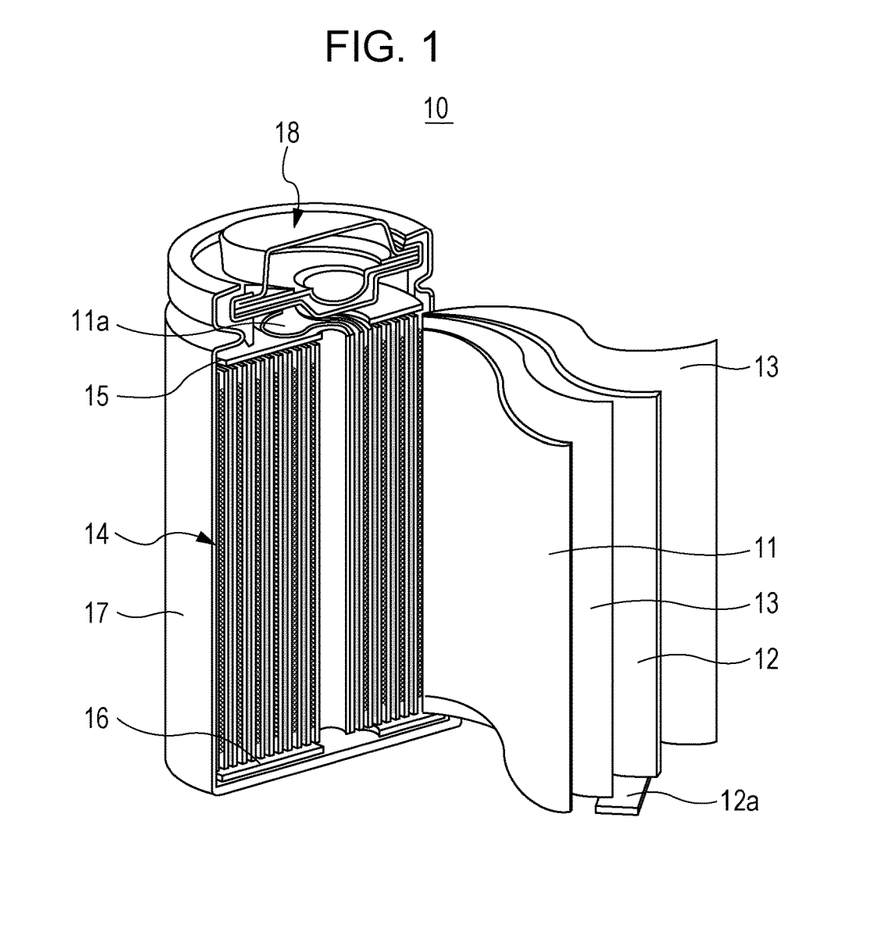
FIG. 1 is a partly sectioned view of a non-aqueous electrolyte secondary battery according to an embodiment of the present disclosure.

FIG. 1 is a partly sectioned view of a non-aqueous electrolyte secondary battery 10 serving as an example. For example, the non-aqueous electrolyte secondary battery 10 includes a positive electrode 11 including a positive electrode active material layer, a negative electrode 12, a separator 13 disposed between the positive electrode 11 and the negative electrode 12, and a non-aqueous electrolyte containing a non-aqueous solvent (not shown in FIG. 1). The positive electrode 11 and the negative electrode 12 are wound with the separator 13 therebetween to thereby form a wound electrode assembly 14. The wound electrode assembly 14 is contained within a battery package can 17 having, for example, a cylindrical form such that insulators 15 and 16 are disposed over and under the wound electrode assembly 14. For example, the battery package can 17 is made of steel and also functions as a negative electrode terminal. The battery package can 17 has, for example, a diameter of about 18 mm and a height of about 65 mm.

A current collecting tab 12a of the negative electrode 12 is welded to an inner bottom portion of the battery package can 17. A current collecting tab 11a of the positive electrode 11 is welded to a bottom plate portion of a current cut-off sealing member 18 including a safety unit. A non-aqueous electrolytic solution, which is a non-aqueous electrolyte in liquid form, is supplied through an opening into the battery package can 17. After the non-aqueous electrolytic solution is supplied, the battery package can 17 is sealed with the current cut-off sealing member 18 including a safety valve and a current cut-off unit. In summary, the non-aqueous electrolyte secondary battery 10 has the following configuration: the battery package can 17, which is sealed as described above, includes the current collecting tabs 11a and 12a serving as positive and negative electrode terminals; and the battery package can 17 contains the positive electrode 11, the negative electrode 12, the separator 13, and the non-aqueous electrolyte.

In a non-aqueous electrolyte secondary battery having such a configuration, the filling property of an active material in the positive electrode active material layer is, for example, enhanced from the viewpoint of energy density. Hereinafter, components of the non-aqueous electrolyte secondary battery 10 containing a positive electrode active material according to an embodiment of the present disclosure will be described in detail.

Positive Electrode

The positive electrode 11 includes, for example, a positive electrode current collector formed of a metal foil or the like and a positive electrode active material layer formed on the positive electrode current collector. The positive electrode current collector is, for example, a foil of a metal that is stable in a potential range of the positive electrode, such as aluminum, or a film having a surface layer formed of a metal that is stable in a potential range of the positive electrode, such as aluminum. The positive electrode active material layer, for example, contains, in addition to the positive electrode active material, a conductive agent, a binder, and the like.

The positive electrode active material contains a lithium-nickel compound oxide having a layered rock-salt type crystal structure and represented by a general formula of $Li_xNi_yM_{1-y}O_2$ where M includes at least one metal element selected from cobalt (Co) and manganese (Mn) and x and y satisfy $0.1 \leq x \leq 1.2$ and $0.3 < y < 1$.

$LiCoO_2$ is one of positive electrode active materials that has been practically used. However, in order to achieve low cost and high capacity, lithium-nickel compound oxide that is a lithium-transition metal compound oxide mainly containing nickel (Ni) is used, for example. The lithium-nickel compound oxide, for example, has a high Ni content. Accordingly, as described above, the Ni content y is, for example, more than 0.3 and less than 1.

The metal element M, for example, includes at least one selected from Co and Mn. For example, from the viewpoint of safety and reduction in cost, M includes Mn. In addition to Co and Mn, M may further include at least one other metal element selected from magnesium (Mg), zirconium (Zr), molybdenum (Mo), tungsten (W), aluminum (Al), chromium (Cr), vanadium (V), cerium (Ce), titanium (Ti), iron (Fe), potassium (K), gallium (Ga), and indium (In), for example.

The lithium-nickel compound oxide may be synthesized from lithium material as with lithium-transition metal compound oxides having been practically used ($LiCoO_2$, $LiNi_{0.33}Mn_{0.33}Co_{0.33}O_2$, and the like). However, in order to obtain a layered rock-salt phase as a stable phase by a conventional synthesizing method, since Ni ions and Li ions substantially have the same ion radius, it is necessary to add a relatively excess amount of Li and to set the calcination temperature so as to be in a range of 700° C. to 900° C. A calcination temperature of less than the lower limit (700° C.) is not preferred because crystal growth may become insufficient. A calcination temperature of more than the upper limit (900° C.) is not preferred because Ni ions enter lithium sites to cause site exchange (cation mixing) between Ni ions and Li ions, so that the crystal structure may be distorted and battery characteristics may be degraded. In this way, with control of the calcination temperature, synthesizing the lithium-nickel compound oxide is difficult, compared with similar conventional synthesis of lithium-transition metal compound oxides from lithium material.

Accordingly, the inventors of the present disclosure considered the following synthesis method of lithium-nickel compound oxide: a sodium-transition metal compound oxide is obtained and sodium (Na) in the sodium-transition metal compound oxide is replaced by lithium (Li) through ion exchange. The sodium-transition metal compound oxide is synthesized from a sodium material composed of Na ions having a larger ion radius than Li ions, and a nickel material. The inventors performed thorough studies and have found the following: when the synthesis of the sodium-transition metal compound oxide is performed at a calcination temperature in the range of 600° C. to 1100° C., a sodium-nickel compound oxide having an undistorted crystal structure can be synthesized. The inventors confirmed that a lithium-nickel compound oxide subsequently obtained by ion exchange had a substantially spherical form and a low average surface roughness.

In the method of replacing Na ions by Li ions through ion exchange, a layered rock-salt phase can be obtained and properties and crystal size of the product can be controlled, even when the calcination temperature and the amount of Na during synthesis of the sodium-transition metal compound oxide are considerably changed, compared with the conventional method of obtaining a lithium-nickel compound oxide (such as $LiNi_{0.33}Mn_{0.33}Co_{0.33}O_2$) from lithium material. In other words, by optimizing the width of the control range of the calcination temperature and by setting the calcination temperature so as to be in the range of 600° C. to 1100° C., crystal growth occurs without distortion or collapse of the crystal structure during calcination, so that the form of the particles can be controlled.

The sodium material is at least one selected from sodium (metal sodium) and sodium compounds. Such sodium compounds are not particularly limited as long as they contain sodium. Examples of the sodium material include oxides such as $Na_2O$ and $Na_2O_2$, salts such as $Na_2CO_3$ and $NaNO_3$, and a hydroxide such as NaOH. Of these, in particular, $NaNO_3$ is preferred.

The nickel material is not particularly limited as long as it is a nickel-containing compound. Examples of the nickel material include oxides such as $Ni_3O_4$, $Ni_2O_3$, and $NiO_2$, salts such as $NiCO_3$ and $NiCl_2$, a hydroxide such as $Ni(OH)_2$, and an oxyhydroxide such as NiOOH. Of these, in particular, for example, $NiO_2$ and $Ni(OH)_2$ are preferred.

The method of synthesizing a sodium-nickel compound oxide is as follows. A mixture containing a sodium material and a nickel material is prepared. The sodium material and the nickel material are, for example, mixed in such a ratio that the layered rock-salt type crystal structure is generated. Specifically, in a general formula of $Na_zNiO_2$, the sodium content z is, for example, 0.5 to 2, for example, 0.8 to 1.5, for example, 1. For example, the mixing may be performed so as to provide a chemical composition of $NaNiO_2$. The mixing process is not particularly limited as long as the materials can be uniformly mixed. For example, the mixing can be performed with a known mixing device such as a mixer.

Subsequently, the mixture is calcined in the air or under a stream of oxygen. The calcination temperature can be appropriately set depending on, for example, the composition of the mixture. The calcination temperature is, for example, 600° C. to 1100° C., for example, 700° C. to 1000° C. The calcination time can be appropriately changed depending on, for example, the calcination temperature. For example, when the calcination temperature is 600° C. to 1100° C., the calcination time is, for example, 1 to 50 hours. When the calcination temperature is 900° C. to 1000° C., the calcination time is, for example, 1 to 10 hours. A cooling process is not particularly limited. Natural cooling (rapid cooling) or gradual cooling may be employed. After calcination, if necessary, the calcined material is, for example, ground by a known process. In this way, the sodium-nickel compound oxide can be obtained.

The lithium-nickel compound oxide can be prepared by treating the sodium-transition metal compound oxide such that sodium (Na) is replaced by lithium (Li) through ion exchange. A process of replacing Na by Li through ion exchange is performed by, for example, adding molten salt of at least one lithium salt selected from the group consisting of lithium nitrate, lithium sulfate, lithium chloride, lithium carbonate, lithium hydroxide, lithium iodide, and lithium bromide, to the sodium-transition metal compound oxide and by performing heating. Alternatively, for example, another process may be employed in which the sodium-transition metal compound oxide is immersed in a solution containing the at least one lithium salt.

The heating temperature during the ion exchange treatment is, for example, 200° C. to 400° C., for example, 330° C. to 380° C. When the heating temperature during the ion exchange treatment is less than 330° C., there are cases where it becomes difficult to introduce site vacancies for lithium. On the other hand, when the heating temperature during the ion exchange treatment is more than 380° C., there are cases where the crystal structure is turned into a partially Li-excess crystal structure and a uniform crystal structure cannot be obtained, which is not preferred. The treatment time is, for example, 2 to 20 hours, for example, 5 to 15 hours.

For the ion exchange treatment, there is another suitable process of treating a sodium-transition metal compound oxide within an organic solvent or an aqueous solution in which a lithium compound is dissolved. In such a case, a sodium-transition metal compound oxide is placed into an organic solvent in which a lithium compound is dissolved, and treated at a temperature equal to or lower than the boiling point of the organic solvent. In order to increase the ion exchange rate, the ion exchange treatment is, for example, performed at a temperature close to the boiling point of the organic solvent under reflux. The treatment temperature is, for example, 100° C. to 200° C., for example, 140° C. to 180° C. The treatment time is not particularly limited. However, a treatment at low temperature requires extra reaction time. Accordingly, the reaction time is, for example, 5 to 50 hours, for example, 10 to 20 hours. In this way, the target lithium-nickel compound oxide (represented by general formula of $Li_xNi_yM_{1-y}O_2$, $0.1 \leq x \leq 1.2$, $0.3 < y < 1$) can be obtained.

The Li content x, for example, satisfies $0.1 \leq x \leq 1.2$. The larger the value of x, the higher the capacity becomes. However, when x is larger than 1.2, the amount of alkali remaining on the surface of lithium-nickel compound oxide becomes large. As a result, during the battery production process, gelation of slurry occurs and the amount of transition metal participating in the oxidation-reduction reaction is decreased, so that the capacity is probably decreased. Li is inserted and extracted during charging and discharging. With consideration of extraction of Li during charging, the lower limit of x is, for example, 0.1. Accordingly, x is, for example, 0.1 or more and 1.2 or less.

In a lithium-nickel compound oxide produced in this way, when the ion exchange does not completely proceed, some amount of Na may remains. In this case, the lithium-nickel compound oxide is represented by a general formula of $Li_{xu}Na_{x(1-u)}Ni_yM_{1-y}O_2$ where M includes at least one metal element selected from cobalt (Co) and manganese (Mn) and x, y, and u satisfy $0.1 \leq x \leq 1.2$, $0.3 < y < 1$, and $0.95 < u \leq 1$. The symbol u represents the exchange ratio of Na replaced by Li through ion exchange. In the case of u=1, a lithium-nickel compound oxide provided by complete ion exchange is, for example, $LiNi_{0.35}C_{0.35}Mn_{0.3}Mn_2$.

Hereinafter, particles of the lithium-nickel compound oxide will be described in detail. Regarding the lithium-nickel compound oxide, crystallites constitute primary particles; and the crystallites gather together, that is, a large number of crystallites aggregate to form secondary particles.

The volumetric average particle size (D50) of the lithium-nickel compound oxide can be determined by the diffracted and scattered light method. The volumetric average particle size (D50) denotes a particle size at a volume accumulated value of 50% in the particle size distribution. The volumetric average particle size (D50) is also referred to as a median size. The volumetric average particle size (D50) is, for example, 7 μm or more and 30 μm or less because, for example, a high filling density of the positive electrode active material can be achieved during production of a positive electrode. When the D50 value is less than the lower limit, the particle size of primary particles forming secondary particles becomes small, which is not preferred. When the D50 value is more than the upper limit, it becomes difficult to form a positive electrode active material layer so as to have a desired thickness, which is not preferred.

The primary particle size can be determined by measuring the profile of the particles with a scanning electron microscope (SEM). Specifically, from an image of particles of lithium-nickel compound oxide captured with a SEM at a magnification of 2000, 10 particles are randomly selected. Regarding the selected 10 particles, grain boundaries and the like are observed and primary particles are individually defined. The maximum sizes of these primary particles (particle maximum sizes) are measured and the average value of the maximum sizes of the 10 particles is determined as the primary particle size. The primary particle size is, for example, 1 μm or more and 5 μm or less. When the primary particle size is less than the lower limit of 1 μm, there are cases where secondary particles formed by aggregation of the primary particles have a high surface roughness. When the primary particle size is more than the upper limit of 5 μm, there are cases where secondary particles formed by aggregation of the primary particles have a large particle size.

The surface roughness of secondary particles of lithium-nickel compound oxide having the volumetric average particle size (D50) depends on the primary particle size and the degree of aggregation of the primary particles. The surface roughness of the secondary particles is evaluated by determining the surface roughness of each secondary particle. The surface roughness (%) is calculated with the following formula described in International Publication No. 2011/125577.

Surface roughness=Maximum radius change with rotation of particle radius in steps of 1°/Particle maximum size The surface roughnesses of 10 secondary particles are determined and the average of the surface roughnesses is calculated to provide an average surface roughness. The lower the average surface roughness of secondary particles, the more preferable it is. This is because, in random formation of a positive electrode active material layer, the filling property of the active material is enhanced. The average surface roughness is, for example, 4% or less, for example, 3% or less.

The circularity is an index of the degree of sphericity of a particle projected onto a two-dimensional surface. The circularity is calculated from an image of a particle obtained by introducing a sample into a measurement system and by applying strobe light to the flow of the sample. A "circumferential length of a circle having the same area as an imaged particle" and a "circumferential length of an imaged particle" are determined by subjecting a particle image obtained by measuring the profile of the particle to image processing. The circularity is calculated with the following formula.

Circularity=Circumferential length of circle having the same area as imaged particle/Circumferential length of imaged particle When the imaged particle has the shape of a perfect circle, it has a circularity of 1. When the particle is considered three-dimensionally, an increase in the circularity means that the degree of sphericity actually increases more than would be expected from the increment. The closer to 1 the circularity, the more enhanced the filling property of the active material forming a positive electrode active material layer, which is preferred. Accordingly, the circularity is, for example, 0.90 or more. When the circularity is less than 0.90, there are cases where the filling property of the active material forming a positive electrode active material layer becomes degraded.

The filling density is an index for evaluation of the filling property of an active material forming a positive electrode active material layer. The higher the filling density, the more enhanced the filling property of the active material, which is preferred. A filling density of a positive electrode active material under application of a pressure is represented by mass per unit volume of the active material. The filling density under application of a pressure of 1 MPa is, for example, 3.0 g/cm$^3$ or more and 3.7 g/cm$^3$ or less. The filling density under application of a pressure of 5 MPa is, for example, 3.5 g/cm$^3$ or more and 4.2 g/cm$^3$ or less. The filling density under application of a pressure of 10 MPa is, for example, 3.8 g/cm$^3$ or more and 4.5 g/cm$^3$ or less. The filling density under application of a pressure of 20 MPa is, for example, 4.0 g/cm$^3$ or more and 4.7 g/cm$^3$ or less. In each of these cases under application of the pressures, when the filling density is less than the lower limit, there is a possibility that the filling property of the active material in the positive electrode active material layer is not sufficient and, for example, a decrease in the energy density, a decrease in the conductivity, or separation of the active material is caused. When the filling density is more than the upper limit, there are cases where the amount of gaps in the positive electrode active material layer becomes small and diffusion of ions through a non-aqueous electrolytic solution becomes difficult.

Hereafter, other components of the positive electrode active material layer will be described. The conductive agent is used to enhance the electric conductivity of the positive electrode active material layer. Examples of the conductive agent include carbon materials such as carbon black, acetylene black, Ketjenblack, and graphite. These materials may be used alone or in combination of two or more thereof.

The binder is used to keep positive electrode active material particles in sufficient contact with each other, to keep the positive electrode active material and the conductive agent in sufficient contact with each other, and to enhance the binding property of the positive electrode active material and the like to the surface of the positive electrode current collector. Examples of the binder include polytetrafluoroethylene (PTFE), polyvinylidene fluoride (PVdF), and modified substances of the foregoing. The binder may be used in combination with a thickener such as carboxymethyl cellulose (CMC) or polyethylene oxide (PEO).

Negative Electrode

The negative electrode is not particularly limited and may be a negative electrode commonly used for non-aqueous electrolyte secondary batteries. The negative electrode includes, for example, a negative electrode current collector formed of a metal foil or the like and a negative electrode active material layer formed on the negative electrode current collector. The negative electrode current collector is, for example, a foil of a metal that is stable in a potential range of the negative electrode, such as copper, or a film having a surface layer formed of a metal that is stable in a potential range of the negative electrode, such as copper. The negative electrode active material layer, for example, contains, in addition to the negative electrode active material, a binder.

The negative electrode active material may be any material into which lithium ions can be inserted and from which lithium ions can be extracted. Examples of the negative electrode active material include natural graphite, artificial graphite, lithium, silicon, carbon, tin, germanium, aluminum, lead, indium, gallium, lithium alloys, carbon and silicon into which lithium has already been inserted, and alloys and mixtures of the foregoing. As in the positive electrode, the binder may be a fluorine based polymer, a rubber based polymer, or the like. The binder may be used in combination with a thickener such as CMC.

Non-Aqueous Electrolyte

The non-aqueous electrolyte contains, for example, a non-aqueous solvent and an electrolyte salt dissolved in the non-aqueous solvent. The non-aqueous electrolyte is not limited to a non-aqueous electrolytic solution that is an electrolyte in liquid form and may be a solid electrolyte using a gelled polymer.

Examples of the non-aqueous solvent include non-aqueous solvents that are commonly used: cyclic ester carbonates such as ethylene carbonate (EC), chain esters such as dimethyl carbonate (DMC), carboxylic acid esters such as γ-butyrolactone (GBL), cyclic ethers such as crown ethers, chain ethers, nitriles, amides, halogen substitution products in which hydrogen atoms of such non-aqueous solvents are replaced by halogen atoms such as fluorine atoms, and solvent mixtures of the foregoing. In particular, preferred is a mixture of a cyclic ester carbonate that is a high dielectric solvent and a chain ester that is a low viscosity solvent.

The electrolyte salt is, for example, a lithium salt. The lithium salt can be selected from supporting salts that have been commonly used for non-aqueous electrolyte secondary batteries. Specific examples of the lithium salt include $LiPF_6$, $LiBF_4$, $LiAsF_6$, $LiClO_4$, $LiCF_3SO_3$, $LiN(FSO_2)_2$, $LiN(ClF_{2l+1}SO_2)(C_mF_{2m+1}SO_2)$ (1 and m represent an integer of 1 or more), $LiC(C_pF_{2p+1}SO_2)(C_qF_{2q+1}SO_2)(C_rF_{2r+1}SO_2)$ (p, q, and r represent an integer of 1 or more), $Li[B(C_2O_4)_2]$, $Li[B(C_2O_4)F_2]$, $Li[P(C_2O_4)F_4]$ and $Li[P$ $(C_2O_4)_2F_2$]. These lithium salts may be used alone or in combination of two or more thereof.

The non-aqueous electrolyte may appropriately contain an additive. The additive is used for the purpose of, for example, forming good films on the positive and negative electrodes. Examples of the additive include vinylene carbonate (VC), ethylene sulfite (ES), cyclohexylbenzene (CHB), and modified substances of the foregoing. These additives may be used alone or in combination of two or more thereof. The ratio of the additive to the non-aqueous electrolyte is not particularly limited and is, for example, about 0.05% to about 10% by mass.

Separator

The separator 13 is, for example, a porous sheet having ion permeability and an insulating property. Specific examples of the porous sheet include a microporous film, woven fabric, and non-woven fabric. The material of the separator 13 is, for example, a polyolefin such as polyethylene or polypropylene.

EXAMPLES

Hereinafter, the present disclosure will be specifically described further in detail with reference to Examples and Comparative examples. However, the present disclosure is not limited to Examples below. Lithium-nickel compound oxide and the non-aqueous electrolyte secondary battery 10 having the structure in FIG. 1 are specifically produced by the following methods.

Example 1

Production of Positive Electrode

In the preparation of a positive electrode active material, in order to achieve a composition of $Na_{0.95}Ni_{0.35}Co_{0.35}Mn_{0.3}O_2$ (initial composition), sodium nitrate ($NaNO_3$), nickel(II) oxide (NiO), cobalt(II,III) oxide ($Co_3O_4$), and manganese(III) oxide ($Mn_2O_3$) were mixed. After that, the mixture was kept at a calcination temperature of 1000° C. for 35 hours to thereby provide a sodium-transition metal compound oxide.

A molten salt was prepared that was a mixture of lithium nitrate ($LiNO_3$) and lithium hydroxide (LiOH) mixed in a ratio of 61:39 in mol %. To 5 g of the sodium-transition metal compound oxide, five equivalents (25 g) of the molten salt was added. After that, 30 g of the mixture was kept at a calcination temperature of 200° C. for 10 hours so that sodium of the sodium-transition metal compound oxide was replaced by lithium through ion exchange. The ion-exchanged substance was subsequently rinsed to provide a lithium-nickel compound oxide.

The lithium-nickel compound oxide was analyzed by powder X-ray diffraction (XRD) method with a powder XRD measurement device (manufactured by Rigaku Corporation, trade name "RINT2200", X-ray source: Cu—Kα) to thereby identify the crystal structure. As a result, the crystal structure was found to belong to a layered rock-salt type crystal structure. In addition, the composition of the lithium-nickel compound oxide was measured by inductively coupled plasma (ICP) optical emission spectrometry with an ICP optical emission spectrometer (manufactured by Thermo Fisher Scientific Inc., trade name "iCAP6300") and was found to be $Li_{0.95}Ni_{0.35}Co_{0.35}Mn_{0.3}O_2$.

The lithium-nickel compound oxide represented by the formula of $Li_{0.95}Ni_{0.35}Co_{0.35}Mn_{0.3}O_2$ was classified. The resultant material having a volumetric average particle size (D50) of 7 µm or more and 30 µm or less was used as the positive electrode active material.

Subsequently, the positive electrode active material represented by $Li_{0.95}Ni_{0.35}Co_{0.35}Mn_{0.3}O_2$, a carbon powder serving as a conductive agent, and a polyvinylidene fluoride powder serving as a binder were mixed with respective percentages by mass of 92%, 5%, and 3%. This mixture was mixed with a solution of N-methyl-2-pyrrolidone (NMP) to prepare slurry. This slurry was applied to both surfaces of an aluminum current collector having a thickness of 15 µm by the doctor blade method to thereby form positive electrode active material layers. After that, the resultant member was pressed with a press roller so as to have a short side length of 55 mm and a long side length of 600 mm. Thus, a positive electrode in Example 1 was provided.

Production of Negative Electrode

Regarding a negative electrode active material, three materials that were natural graphite, artificial graphite, and artificial graphite the surface of which was covered with non-crystalline carbon were prepared and used as a mixture. The negative electrode 12 was produced in the following manner. The negative electrode active material, a styrene-butadiene copolymer serving as a binder, and carboxymethyl cellulose serving as a thickener were mixed with respective percentages by mass of 98%, 1%, and 1%. This mixture was mixed with water to prepare slurry. This slurry was applied to both surfaces of a copper current collector having a thickness of 10 µm by the doctor blade method to thereby form negative electrode active material layers. After that, the resultant member was pressed with a press roller so as to achieve a predetermined density and to have a short side length of 57 mm and a long side length of 620 mm. Thus, a negative electrode was provided.

Production of Non-Aqueous Electrolyte $LiPF_6$ serving as an electrolyte salt was dissolved at 1.6 mol/L in an equivolume non-aqueous solvent mixture of ethylene carbonate (EC) and diethyl carbonate (DEC). Thus, a non-aqueous electrolytic solution serving as a non-aqueous electrolyte was obtained and used for battery production.

Production of Non-Aqueous Electrolyte Secondary Battery

The positive electrode, the negative electrode, and the non-aqueous electrolytic solution produced above were used to produce the non-aqueous electrolyte secondary battery 10 having the structure in FIG. 1 by the following procedures. The positive electrode 11 and the negative electrode 12 produced above were wound with the separator 13 therebetween to thereby form the wound electrode assembly 14. Subsequently, the wound electrode assembly 14 was contained within the battery package can 17 having a cylindrical form such that the insulators 15 and 16 were disposed over and under the wound electrode assembly 14. The battery package can 17 was made of steel and also functioned as a negative electrode terminal. The battery package can 17 had a diameter of 18 mm and a height of 65 mm. The current collecting tab 12a of the negative electrode 12 was welded to an inner bottom portion of the battery package can 17. The current collecting tab 11a of the positive electrode 11 was welded to a bottom plate portion of the current cut-off sealing member 18 including a safety unit. The non-aqueous electrolytic solution was supplied through an opening into the battery package can 17. After that, the battery package can 17 was sealed with the current cut-off sealing member 18 including a safety valve and a current cut-off unit. Thus, the non-aqueous electrolyte secondary battery 10 was obtained. This non-aqueous electrolyte secondary battery was designed so as to have a capacity of 2400 mAh.

Example 2

A positive electrode active material and a non-aqueous electrolyte secondary battery in Example 2 were produced as in Example 1 except that, in the preparation of the positive electrode active material in Example 1, the calcination temperature of the sodium-transition metal compound oxide was changed from 1000° C. to 950° C.

Example 3

A positive electrode active material and a non-aqueous electrolyte secondary battery in Example 3 were produced as in Example 1 except that, in the preparation of the positive electrode active material in Example 1, the calcination temperature of the sodium-transition metal compound oxide was changed from 1000° C. to 900° C.

Example 4

A positive electrode active material and a non-aqueous electrolyte secondary battery in Example 4 were produced as in Example 1 except that, in the preparation of the positive electrode active material in Example 1, the calcination temperature of the sodium-transition metal compound oxide was changed from 1000° C. to 850° C.

Example 5

A positive electrode active material and a non-aqueous electrolyte secondary battery in Example 5 were produced as in Example 1 except that, in the preparation of the positive electrode active material in Example 1, the calcination temperature of the sodium-transition metal compound oxide was changed from 1000° C. to 800° C.

Comparative Example 1

A positive electrode active material and a non-aqueous electrolyte secondary battery in Comparative example 1 were produced as in Example 1 except that, in the preparation of the positive electrode active material in Example 1, in order to provide $Li_{0.95}Ni_{0.35}CO_{0.35}Mn_{0.3}O_2$, lithium nitrate ($LiNO_3$), nickel (IV) oxide ($NiO_2$), cobalt(II,III) oxide ($Co_3O_4$), and manganese(III) oxide ($Mn_2O_3$) were mixed and the mixture was then kept at a calcination temperature of 700° C. for 10 hours with calcination interruptions to thereby provide a lithium-nickel compound oxide.

Comparative Example 2

A positive electrode active material and a non-aqueous electrolyte secondary battery in Comparative example 2 were produced as in Comparative example 1 except that, in the preparation of the positive electrode active material in Comparative example 1, the calcination temperature was changed from 700° C. to 600° C.

In order to check particle characteristics relating to the filling property of the positive electrode active materials prepared in Examples 1 to 5 and Comparative examples 1 and 2, evaluations were performed in terms of primary particle size, volumetric average particle size, average surface roughness, circularity, and filling density. Hereafter, these evaluations will be described in detail.

Evaluation of Volumetric Average Particle Size

The positive electrode active materials in Examples 1 to 5 and Comparative examples 1 and 2 were evaluated in terms of volumetric average particle size (D50). The volumetric average particle size (D50) was measured in water serving as a dispersion medium with a laser diffraction/scattering particle size distribution measurement device (manufactured by HORIBA, Ltd., trade name "LA-750"). The measurement results are described in Table 1.

Observation with Scanning Electron Microscope

The positive electrode active materials in Examples 1 to 5 and Comparative examples 1 and 2 were observed with a scanning electron microscope (SEM) in terms of surface profile of particles. From an image of particles captured with the SEM at a magnification of 2000, 10 particles were randomly selected. Regarding the selected 10 particles, the primary particle sizes and the particle maximum sizes of the secondary particles were measured and the average value of the primary particle sizes and the average value of the particle maximum sizes were determined.

The "particle maximum size" denotes the maximum size of a particle in the measurement of the profile of the particle. The measurement results in terms of primary particle size are described in Table 1.

Figure 2:
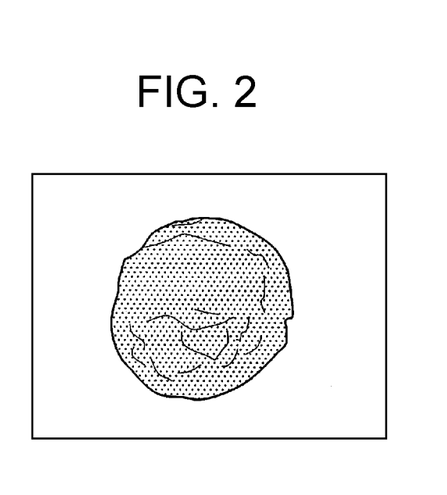
FIG. 2 is a SEM image in Example 1.
Figure 3:
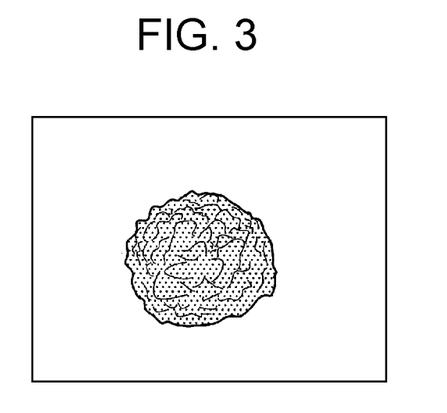
FIG. 3 is a SEM image in Comparative example 1.

FIGS. 2 and 3 are schematic views of particles observed with the SEM in Example 1 and Comparative example 1. Referring to FIG. 2, in Example 1, a secondary particle formed by melting and aggregation of primary particles was observed. The secondary particle had a relatively smooth surface and a substantially spherical form. Such secondary particles in Example 1 had surface portions without grain boundaries. In contrast, referring to FIG. 3 regarding Comparative example 1, a secondary particle formed by aggregation of primary particles was observed. The secondary particle had irregularities in the surface and did not have a substantially spherical form.

Evaluation of Average Surface Roughness

The positive electrode active materials in Examples 1 to 5 and Comparative examples 1 and 2 were evaluated in terms of average surface roughness. The surface roughness was calculated with the following formula.

Surface roughness=Maximum radius change with rotation of particle radius in steps of 1°/Particle maximum size The particle radius was determined as a distance, to a circumferential point of a secondary particle, from the center of the secondary particle, the center being defined as the point at which the maximum size of the secondary particle (particle maximum size) was halved in profile measurement described below. The radius change with rotation of the particle radius in steps of 1° is determined as an absolute value. The maximum radius change denotes the largest value among the radius changes with rotation of the particle radius in steps of 1° for the entire circumference of a secondary particle.

Figure 4:
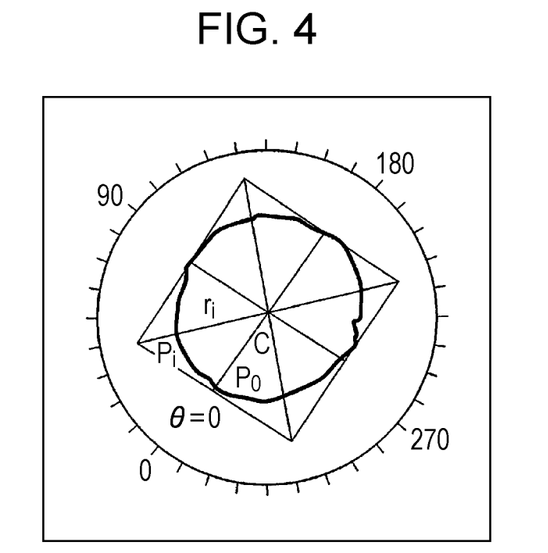
FIG. 4 is an explanatory view of average surface roughness in Example 1.
Figure 5:
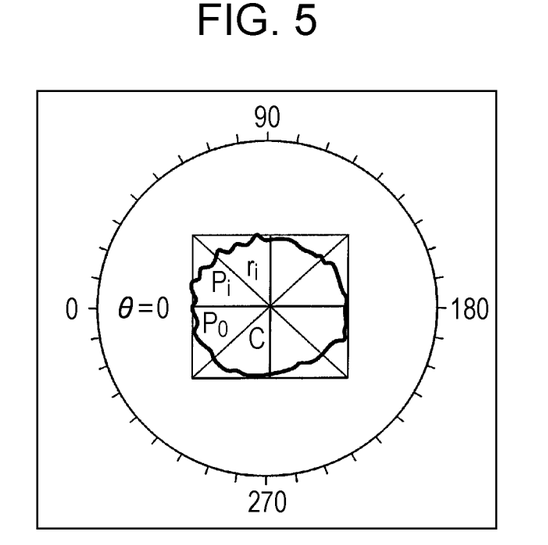
FIG. 5 is an explanatory view of average surface roughness in Comparative example 1.

FIGS. 4 and 5 were used in profile measurements for determining surface roughness in Example 1 and Comparative example 1. FIG. 4 illustrates the circumferential profile of a secondary particle based on the SEM image in FIG. 2. FIG. 5 illustrates the circumferential profile of a secondary particle based on the SEM image in FIG. 3. In each of FIGS. 4 and 5, the distance from the central position C to the circumferential point $P_1$ of the particle is measured as the particle radius $r_i$. The central position C is where the particle maximum size is halved. The circumferential position of the particle at which the particle radius r became the largest was defined as the reference point $P_0$ ($\theta=0$). The line segment $CP_0$ extends from the reference point $P_0$ to the center C. The line segment $CP_i$ extends from another circumferential point $P_i$ of the secondary particle to the center C. An angle formed between the line segment $CP_0$ and the line segment $CP_i$ was defined as $\theta$. The particle radius r was determined while $\theta$ was changed in steps of 1°. From the particle radius r, the surface roughness was calculated with the above-described formula. The values of surface roughness for 10 secondary particles were averaged to determine the average surface roughness. The results of average surface roughness are described in Table 1.

Evaluation of Circularity

The positive electrode active materials in Examples 1 to 5 and Comparative examples 1 and 2 were evaluated in terms of circularity. The circularity was calculated from still images of particles obtained by introducing such a positive electrode active material as a sample into a measurement system and by applying strobe light to the flow of the sample. Specifically, 5000 or more particles were measured. A dispersion medium used was ion-exchanged water containing polyoxyethylene sorbitan monolaurate as a surfactant. The positive electrode active material was introduced as a sample into the measurement system. The dispersion medium was used to form a flat sample flow. Strobe light was applied to the sample flow and a still image of passing particles was captured. The captured particle image was subjected to image analysis and an equivalent circle diameter and a circularity of such a particle were calculated with the following formula from the projected area and the circumferential length of the particle.

Circularity=Circumferential length of circle having the same area as imaged particle/Circumferential length of imaged particle The circularity was measured with a flow particle image analyzer (manufactured by SYSMEX CORPORATION, trade name "FPIA-2100"). The measurement results of circularity are described in Table 1.

Table 1 summarizes the results of Examples 1 to 5 and Comparative examples 1 and 2 in terms of volumetric average particle size, primary particle size, average surface roughness, and circularity.

TABLE 1

| | Composition Ni/Co/Mn | Volumetric average particle size (μm) | Primary particle size (μm) | Average surface roughness (%) | Circularity |
|---|---|---|---|---|---|
| Example 1 | 35/35/30 | 10.1 | 5.0 | 1.5 | 0.92 |
| Example 2 | 35/35/30 | 11.1 | 4.0 | 2.1 | 0.90 |
| Example 3 | 35/35/30 | 10.3 | 2.0 | 2.4 | 0.90 |
| Example 4 | 35/35/30 | 9.9 | 1.5 | 2.9 | 0.91 |
| Example 5 | 35/35/30 | 10.2 | 1.0 | 4.0 | 0.90 |
| Comparative example 1 | 35/35/30 | 10.6 | 0.5 | 4.4 | 0.88 |
| Comparative example 2 | 35/35/30 | 10.0 | 0.2 | 5.0 | 0.87 |

Table 1 indicates the following. Regarding volumetric average particle size, the results of Examples 1 to 5 are not considerably different from those of Comparative examples 1 and 2. However, the primary particle sizes in Examples 1 to 5 are 1 μm or more and 5 μm or less, whereas those in Comparative examples 1 and 2 are less than 1 μm. Accordingly, Examples 1 to 5 provide larger primary particles than Comparative examples 1 and 2. The surface roughness in Examples 1 to 5 is lower than that in Comparative examples 1 and 2. In particular, in Examples 1 to 4, the surface roughness is considerably decreased. In Examples 1 to 5, the circularity is 0.90 or more and the particles have a substantially spherical form. The reason why the surface roughness is thus decreased is probably as follows. In the method of preparing a positive electrode active material in Comparative examples 1 and 2, the calcination temperatures were not high enough to cause sintering and hence the particles had a rough profile. In contrast, in the method of replacing Na by Li through ion exchange, use of Na salt enhanced the bonding strength and, in spite of calcination at high temperatures, the crystal structure was maintained; and, high calcination temperatures caused sintering, so that surface roughness was decreased.

Evaluation of Filling Density

The positive electrode active materials in Examples 1 to 5 and Comparative examples 1 and 2 were evaluated in terms of filling density under application of a pressure of 1, 5, 10, or 20 MPa. The filling density of such a positive electrode active material under application of a pressure was calculated as mass per unit volume. Table 2 describes the results of bulk densities under application of pressures.

TABLE 2

| | Filling density under application of 1 MPa (g/cm³) | Filling density under application of 5 MPa (g/cm³) | Filling density under application of 10 MPa (g/cm³) | Filling density under application of 20 MPa (g/cm³) |
|---|---|---|---|---|
| Example 1 | 3.49 | 3.83 | 4.03 | 4.27 |
| Example 2 | 3.45 | 3.81 | 4.00 | 4.25 |
| Example 3 | 3.42 | 3.80 | 3.95 | 4.20 |
| Example 4 | 3.39 | 3.75 | 3.90 | 4.14 |
| Example 5 | 3.37 | 3.72 | 3.88 | 4.11 |
| Comparative example 1 | 2.97 | 3.45 | 3.78 | 3.92 |
| Comparative example 2 | 2.85 | 3.20 | 3.55 | 3.75 |

Table 2 indicates the following. In Examples 1 to 5, each filling density under application of a pressure of 1 MPa is 3.0 g/cm³ or more, which is higher than the bulk densities in Comparative examples 1 and 2. In Examples 1 to 5, each filling density under application of a pressure of 5 MPa is 3.5 g/cm³ or more, which is higher than the bulk densities in Comparative examples 1 and 2. In Examples 1 to 5, each filling density under application of a pressure of 10 MPa is 3.8 g/cm³ or more, which is higher than the bulk densities in Comparative examples 1 and 2. In Examples 1 to 5, each filling density under application of a pressure of 20 MPa is 4.0 g/cm³ or more, which is higher than the bulk densities in Comparative examples 1 and 2.

Such a positive electrode active material allows production of the positive electrode 11 having positive electrode active material layers having a high filling density of the positive electrode active material. As a result, a non-aqueous electrolyte secondary battery having a high energy density per unit volume can be produced.

Measurement of Initial Capacity

At 25° C., each of the non-aqueous electrolyte secondary batteries of Examples 1 to 5 and Comparative examples 1 and 2 was charged at a constant current of 1 It (=2400 mA) until the battery voltage reached 4.3 V, and subsequently discharged at a constant current of 1 It (=2400 mA) until the battery voltage reached 2.5 V. The discharge capacity at this time was defined as the initial capacity of the single battery. The value obtained by dividing the initial capacity by the mass of the positive electrode active material was defined as capacity density. The results are described in Table 3.

TABLE 3

|  | Initial capacity (mAh) | Capacity density (mAh/g) |
|---|---|---|
| Example 1 | 2528 | 157.7 |
| Example 2 | 2456 | 153.9 |
| Example 3 | 2468 | 156.5 |
| Example 4 | 2420 | 155.7 |
| Example 5 | 2435 | 157.8 |
| Comparative example 1 | 2290 | 155.6 |
| Comparative example 2 | 2215 | 157.3 |

Table 3 indicates the following. From the values of initial capacity, each battery of Examples 1 to 5 has a high capacity. Such a battery having a high energy density per unit volume has been obtained by decreasing surface roughness and enhancing the filling property of the active material. From the results of capacity density, each lithium-nickel compound oxide (positive electrode active material) of Examples 1 to 5 does not have a distorted crystal structure and is excellent in terms of battery characteristics.

As has been described, a positive electrode active material for a non-aqueous electrolyte secondary battery, being represented by a general formula of $Li_xNi_yM_{1-y}O_2$ (where M includes at least one metal element selected from Co and Mn, $0.1 \leq x \leq 1.2$, $0.3<y<1$), having a volumetric average particle size (D50) of 7 μm or more and 30 μm or less, and having an average surface roughness of 4% or less, allows formation of a positive electrode active material layer that is excellent in terms of the filling property of the active material. In addition, a non-aqueous electrolyte secondary battery containing such a positive electrode active material for a non-aqueous electrolyte secondary battery has a high energy density.

What is claimed is:

1. A positive electrode active material for a non-aqueous electrolyte secondary battery, being represented by a general formula of $Li_xNi_yM_{1-y}O_2$ (where M includes at least one metal element selected from cobalt (Co) and manganese (Mn), $0.1 \leq x \leq 1.2$, $0.3<y<1$), having a volumetric average particle size (D50) of 7 μm or more and 30 μm or less, and having an average surface roughness of 1.5% or more and 4% or less, wherein M, which includes at least one metal element selected from cobalt (Co) and manganese (Mn), further includes at least one other metal element selected from zirconium (Zr), molybdenum (Mo), tungsten (W), chromium (Cr), vanadium (V), cerium (Ce), titanium (Ti), iron (Fe), potassium (K), gallium (Ga), and indium (In).

2. The positive electrode active material according to claim 1, having a structure of secondary particles formed by aggregation of primary particles having a particle size of 1 μm or more and 5 μm or less.

3. The positive electrode active material according to claim 1, having a circularity of 0.90 or more and 0.92 or less.

4. The positive electrode active material according to claim 1, having a filling density of 3.0 g/cm³ or more and 3.7 g/cm³ or less under application of a pressure of 1 MPa.

5. The positive electrode active material according to claim 1, having a filling density of 3.5 g/cm³ or more and 4.2 g/cm³ or less under application of a pressure of 5 MPa.

6. A non-aqueous electrolyte secondary battery comprising:
a positive electrode containing a positive electrode active material;
a negative electrode; and
a non-aqueous electrolyte,
wherein the positive electrode active material is represented by a general formula of $Li_xNi_yM_{1-y}O_2$ (where M includes at least one metal element selected from cobalt (Co) and manganese (Mn), $0.1 \leq x \leq 1.2$, $0.3<y<1$), has a volumetric average particle size (D50) of 7 μm or more and 30 μm or less, and has an average surface roughness of 1.5% or more and 4% or less, and
M, which includes at least one metal element selected from cobalt (Co) and manganese (Mn), further includes at least one other metal element selected from zirconium (Zr), molybdenum (Mo), tungsten (W), chromium (Cr), vanadium (V), cerium (Ce), titanium (Ti), iron (Fe), potassium (K), gallium (Ga), and indium (In).

* * * * *